(12) United States Patent
Henry

(10) Patent No.: US 9,788,475 B2
(45) Date of Patent: Oct. 17, 2017

(54) AGRICULTURAL AIR CART ASSEMBLY WITH INDIVIDUALLY CONTROLLED PRODUCT DISTRIBUTION LINES

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 192 days.

(21) Appl. No.: 14/568,600

(22) Filed: Dec. 12, 2014

(65) Prior Publication Data

US 2016/0165792 A1    Jun. 16, 2016

(51) Int. Cl.
*A01C 7/10* (2006.01)
*A01C 7/08* (2006.01)

(52) U.S. Cl.
CPC .............. *A01C 7/102* (2013.01); *A01C 7/081* (2013.01)

(58) Field of Classification Search
CPC .. A01C 7/102; A01C 7/10; A01C 7/08; A01C 7/00; A01C 7/081
See application file for complete search history.

(56) References Cited

U.S. PATENT DOCUMENTS

| | | | |
|---|---|---|---|
| 3,067,855 A * | 12/1962 | Lambert | D01G 23/00 19/303 |
| 4,296,695 A | 10/1981 | Quanbeck | |
| 5,821,435 A * | 10/1998 | Kojima | B01D 53/30 73/863.01 |
| 5,915,620 A * | 6/1999 | Doss | A01K 1/0076 237/46 |
| 5,979,343 A | 11/1999 | Gregor et al. | |
| 5,996,516 A | 12/1999 | Benneweis et al. | |
| 6,192,813 B1 | 2/2001 | Memory et al. | |
| 6,308,646 B1 | 10/2001 | Luxon | |
| 6,644,225 B2 | 11/2003 | Keaton | |
| 6,851,377 B2 | 2/2005 | Mayerle et al. | |
| 7,140,311 B2 | 11/2006 | Brueggen | |
| 7,373,890 B2 | 5/2008 | Kowalchuk | |
| 7,665,409 B2 | 2/2010 | Johnson | |
| 2004/0148057 A1 * | 7/2004 | Breed | B60Q 9/008 700/242 |
| 2010/0017073 A1 | 1/2010 | Landphair | |
| 2012/0103238 A1 | 5/2012 | Beaujot et al. | |
| 2012/0174843 A1 | 7/2012 | Friggstad | |
| 2013/0085598 A1 | 4/2013 | Kowalchuk | |
| 2013/0113218 A1 * | 5/2013 | Dorn | F02B 63/044 290/1 A |

FOREIGN PATENT DOCUMENTS

DE    575416    4/1933
WO    WO2008155234    12/2008

* cited by examiner

*Primary Examiner* — Christopher J Novosad
(74) *Attorney, Agent, or Firm* — Rebecca L. Henkel; Rickard K. DeMille

(57) ABSTRACT

An agricultural air cart assembly includes an agricultural air cart. The agricultural air cart includes independently controllable, first and second product metering systems that regulate the rates at which product flows from a storage compartment into corresponding first and second distribution lines. Independently controllable, rotatable fans are operatively connected to corresponding first and second distribution lines and are configured to generate optimized air flows in the first and second distribution lines which entrain and carry the product downstream toward corresponding row units at balanced pressures.

8 Claims, 6 Drawing Sheets

AGRICULTURAL AIR CART ASSEMBLY WITH INDIVIDUALLY CONTROLLED PRODUCT DISTRIBUTION LINES

FIELD OF THE INVENTION

This invention relates generally to agricultural product application equipment, and in particular, to an agricultural air cart assembly with individually controlled product distribution lines.

BACKGROUND OF THE INVENTION

Conventional agricultural seeders are often employed to deposit planting material into soil. Many seeders include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units or opener units that are supported by a common or shared frame that is towed by the tractor.

Agricultural seeders may include one or more ground engaging tools or openers that form a seeding path for planting material deposition into the soil. The openers are used to break the soil to enable seed deposition. After the planting material is deposited, each opener is followed by a packer wheel that packs the soil on top of the deposited material. Seeders commonly use pneumatic systems to transport planting material from a storage hopper to the soil to be deposited. Typically, air flow is provided through tubes or distribution lines to transport product therethrough.

In certain configurations, an air cart is used to meter and transport the planting material (e.g., seeds, fertilizer, etc.) to ground engaging tools within the seeding implement. The air cart may include a hopper having one or more compartments configured for holding various planting material. Certain air carts include a metering system configured to deliver metered quantities of material into a tube or distribution line that transfers the material to the openers. The metering system will control distribution from the one or more compartments of the hopper to distribution lines such that each compartment provides planting material at a desired rate. Typically, an air cart includes a single large fan powered by a single motor, which supplies air flow to all distribution lines for pneumatic delivery of the planting material therethrough. From the distribution lines, an flow is diverted into primary distribution manifolds that then teed secondary distribution lines, which then deliver the planting material toward individual openers and row units of a drill.

To provide consistent delivery rates across the drill, distribution lines are typically the same length, regardless of the distance between the row units they feed and its corresponding feeding header or the air cart. Common lengths of distribution lines to provide flow consistency by keeping pressure the same in the different distribution lines. This can lead to excessively long distribution lines feeding rows that are closer to the headers or air cart, which can clutter the drill with hoses, increase manufacturing costs and increase setup time.

Using a single fan to supply air to multiple distribution lines may be limiting with respect to controlling the distribution of various planting material to different opener units. As will be appreciated, it may be desirable to variably control the air flow to individual distribution lines so that the speed of delivery to different opener units may be varied. It may also be desirable to variably control the metering units to individual distribution lines so that the amount of product to different opener units may be varied. Therefore, it is desired to provide an air cart with each distribution line having its own dedicated fan, meter wheel, and motor so that the speed and volume of product supplied can be variably controlled in each distribution line.

Therefore, it is a primary object and feature of the present invention to provide an agricultural air cart assembly with individually controlled product distribution lines.

It is a further object and feature of the invention to provide an agricultural air cart assembly with individually controlled product distribution lines wherein each distribution line is part of a self-contained unit.

It is a still further object and feature of the invention to provide an agricultural air cart assembly wherein the excess lines used on the air cart is minimized.

SUMMARY OF THE INVENTION

In accordance with the present invention, an agricultural air cart assembly is provided for transmitting a controlled volume of product from a storage compartment to a plurality of row units for depositing the product on an agricultural field. The assembly includes a first distribution line for receiving a first supply of the product from the storage container therein and a second distribution line for receiving a second supply of the product from the storage container therein. A rotatable first fan is operatively connected to the first distribution line and has an adjustable rotational speed. The first fan is configured such that rotation of the first fan generates an air flow in the first distribution line which entrains and carries the first supply of the product downstream toward a first row unit. A rotatable second fan is operatively connected to the second distribution line and has an adjustable rotational speed. The second fan is configured such that rotation of the second fan generates an air flow in the second distribution line which entrains and carries the second supply of the product downstream toward a second row unit.

A first meter wheel is adapted for transferring the first supply of the product from the storage container to the first distribution line. The first meter wheel is adjustable to provide a desired rate at which the first supply of product is transferred to the first distribution line. The first meter wheel and the first fan are powered by a first motor. It is contemplated for the first meter wheel to be operatively connected to the first motor by adjustable linkage. Adjustment of the linkage varies the rate at which the first supply of product is transferred to the first distribution line. Similarly, the first fan may be operatively connected to the first motor by adjustable linkage. Adjustment of the linkage varies the rotational speed of the first fan. A second meter wheel is adapted for transferring the second supply of the product from the storage container to the second distribution line. The second meter wheel is adjustable to provide a desired rate at which the second supply of product is transferred to the second distribution line. The first and second meter wheels are independently driven.

A controller is operable to adjust the rotational speeds of the first and second fans. A first pressure sensor is operatively connected to the controller and is positioned to measure a pressure of the air flow in the first distribution line. The first pressure sensor provides a signal representative of the pressure of the air flow in the first distribution line to the controller. A second pressure sensor is operatively connected to the controller and is positioned to measure a pressure of the air flow in the second distribution line. The second pressure sensor provides a signal representative or the pressure of the air flow in the second distribution line to the controller. The controller adjusts the rotational speed of the first fan in response to the signal received from the first pressure sensor and the controller adjusts the rotational speed of the second fan in response to the signal received from the second pressure sensor. The first and second fans are independently driven.

In accordance with a further aspect of the present invention, an agricultural air cart apparatus is provided. The apparatus includes a storage container for holding a product. First and second distribution lines are adapted for receiving product from the storage container and transporting the product to corresponding first and second row units. First and second product metering systems communicate with the storage container. The first and second product metering systems regulate the flow of product from the product hopper into the first and second distribution lines, respectively. A first fan is in communication with the first distribution line and has an adjustable rotational speed. The first fan is configured such that rotation of the first fan generates an air flow in the first distribution line which entrains and carries the product in the first distribution line downstream toward the first row unit. A second fan is in communication with the second distribution line and has an adjustable rotational speed. The second fan is configured such that rotation of the second fan generates an air flow in the second distribution line which entrains and carries the product in the second distribution line downstream toward the second row unit. A controller is operable to adjust the rotational speeds of the first and second fans independent of each other.

A first motor is adapted to drive the first product metering system and a second motor is adapted to drive a second product metering system. The first and second product metering systems regulate the flows of product from the product hopper into the first and second distribution lines in response to instructions from the controller. The controller is configured to provide the instructions to the first and second product metering systems independently from each other. Each of the first and second product metering systems includes a meter wheel configured to rotate to regulate a rate at which the product flows from the product hopper into a corresponding one of the first and second distribution lines to a desired rate.

The apparatus may also include a first distribution manifold having an input coupled to the first distribution line and an output coupled to the first row unit. A second distribution manifold has an input coupled to the second distribution line and an output coupled to the second row unit. A first pressure sensor operatively connected to the controller and is positioned within the first distribution manifold to measure a pressure of the air flow therein. The first pressure sensor provides a signal representative of the pressure of the air flow in the first distribution manifold to the controller. A second pressure sensor is operatively connected to the controller and is positioned with the second distribution manifold to measure a pressure of the air flow in the second distribution manifold. The second pressure sensor provides a signal representative of the pressure of the air flow in the second distribution manifold to the controller. The controller adjusts the rotational speed of the first fan in response to the signal received from the first pressure sensor. The controller also adjusts the rotational speed of the second fan in response to the signal received from the second pressure sensor. The controller is operable to adjust the first and second product metering systems to regulate a rate at which the product flows from the product hopper into a corresponding one of the first and second distribution lines to a desired rate.

In accordance with a further aspect of the present invention, an agricultural air cart apparatus is provided includes a product hopper holding a product and a product metering system communicating with the product hopper to regulate a flow of product from the product hopper. The apparatus is characterized in that first and second distribution lines are adapted for receiving product from the storage container and transporting the product toward corresponding first and second row units. First and second product metering systems regulate flows of product from the product hopper into the first and second distribution lines, respectively. A first fan is in communication with the first distribution line and has an adjustable rotational speed. The first fan is configured such that rotation of the first fan generates an air flow in the first distribution line which entrains and carries the product in the first distribution line downstream. A second fan is in communication with the second distribution line and has an adjustable rotational speed. The second fan is configured such that rotation of the second fan generates an air flow in the second distribution line which entrains and carries the product in the second distribution line downstream. The rotational speeds of the first and second fans are independently controlled and the first and second product metering systems are independently controlled.

A first motor is adapted to drive the first fan and a second motor is adapted to drive a second fan. A controller is operable to control the rotational speeds of the first and second fans independent of each other. Each of the first and second product metering systems includes a meter wheel configured to rotate to dispense the product at a desired rate. The first motor is adapted to drive the meter wheel of the first product metering system and the second motor is adapted to drive the meter wheel of the second product metering system.

A first pressure sensor is operatively connected to the controller and is positioned to measure a pressure of the air flow in the first distribution line. The first pressure sensor provides a signal representative of the pressure of the air flow in the first distribution line to the controller. A second pressure sensor is operatively connected to the controller and is positioned to measure a pressure of the air flow in the second distribution line. The second pressure sensor provides a signal representative of the pressure of the air flow in the second distribution line to the controller. The controller adjusts the rotational speed of the first fan in response to the signal received from the first pressure sensor and adjusts the rotational speed of the second fan in response to the signal received from the second pressure sensor.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
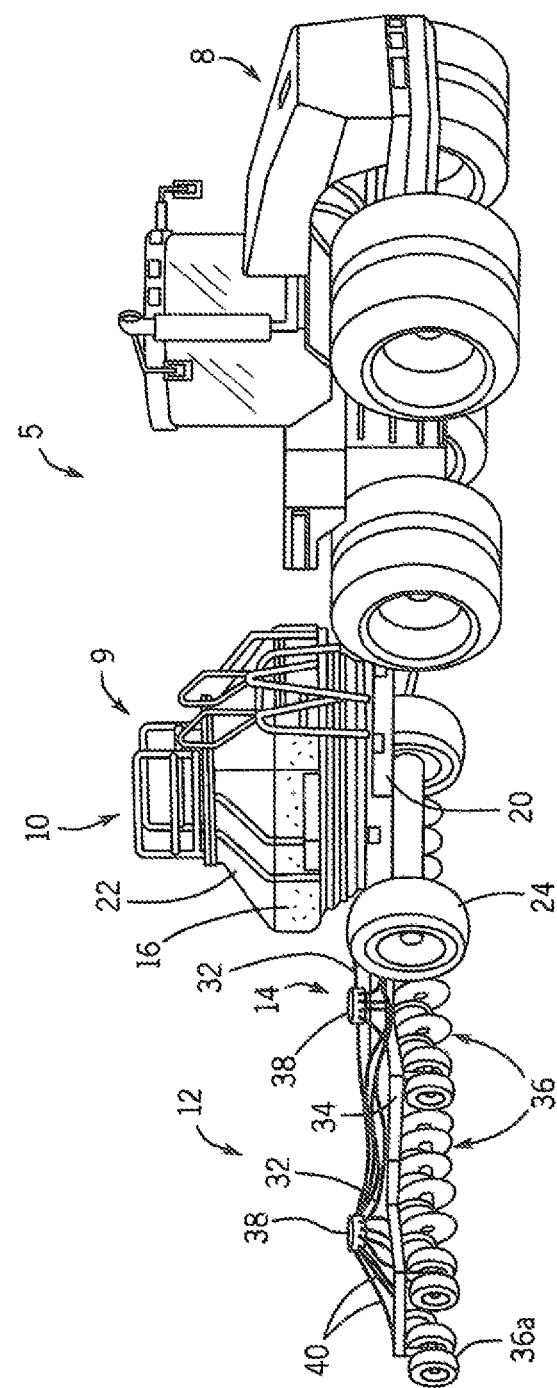
FIG. 1 is an isometric view of a tractor pulling an implement coupled to an agricultural air cart assembly in accordance with the present invention.

Referring to FIG. 1, an agricultural particulate material delivery system 5 is shown that includes a tractor 8 and an agricultural air cart assembly 9. The agricultural air cart assembly 9 includes, e.g. an air cart 10 such as a PRECISION AIR® cart available from the Case IH company, and a material dispensing implement, e.g. a drill 12. As is conventional, the drill 12 includes a frame 34 to which a set of row units 36 is coupled. By way of example, the row units 36 may take the form of a plurality of disc-style opener units 36a, FIG. 1, or a plurality of tip-type opener units 36b, FIG. 2. The row units 36 are configured to cut a furrow into the soil and deposit the product 16 therein. Seed row finishing equipment such as wheel packers or closing wheels 42 may be arranged on the drill 12, such as the embodiment shown in FIG. 2 for closing the furrow(s).

The air cart 10 and the drill 12 are hitched to the tractor 8 and/or each other in a conventional manner. The agricultural air cart assembly 9 further includes a pneumatic distribution system 14 operatively connected to the air cart 10 and the drill 12 for pneumatically delivering product 16 from the air cart 10 to the drill 12 for pneumatic distribution of the product 16 to an agricultural field. By way of example, the product 16 is a particulate material that may be seed, such as small grains, and/or fertilizer, such as dry granular fertilizer.

Figure 3:
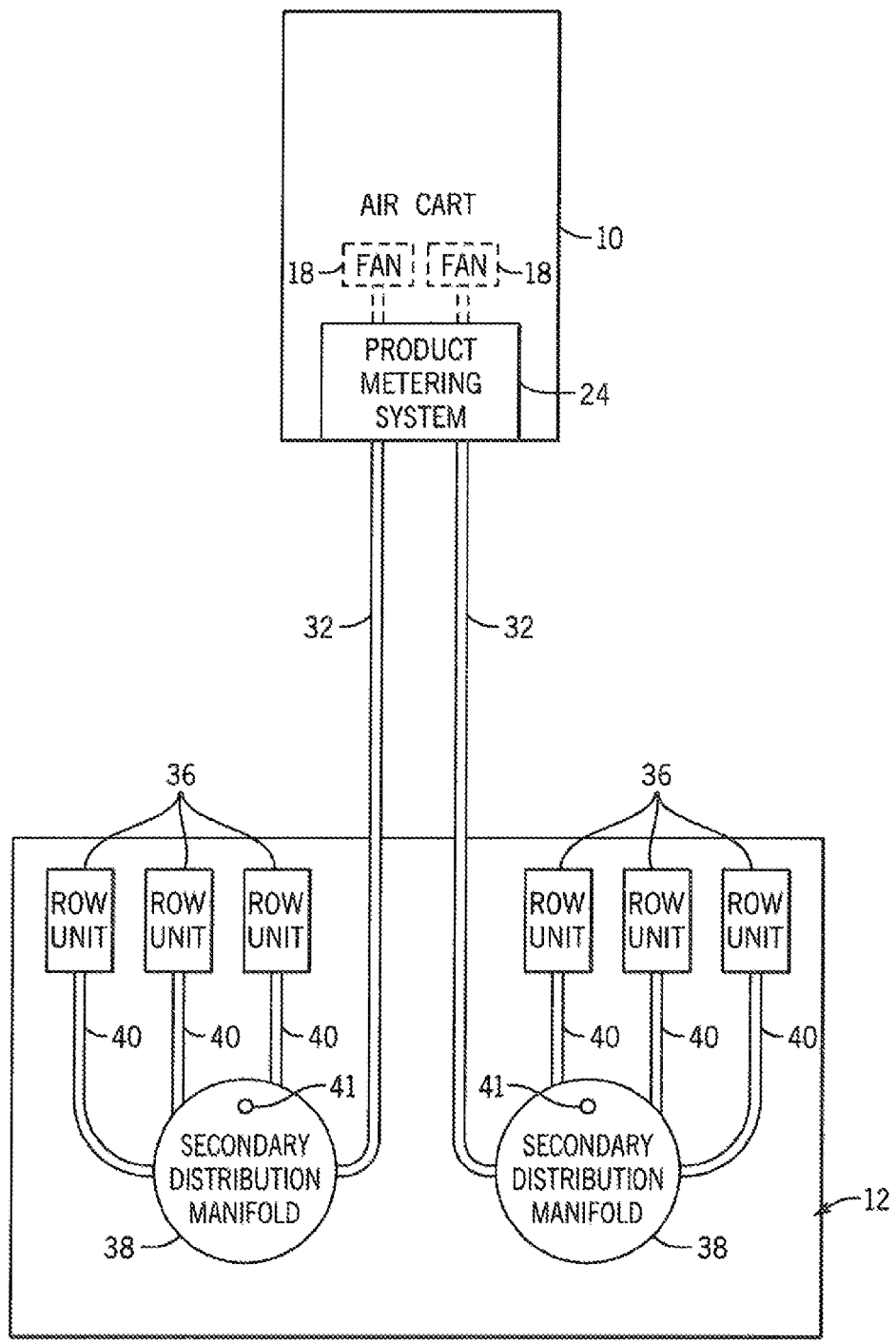
FIG. 3 is a schematic diagram of the agricultural air cart assembly of the present invention coupled to an implement.
Figure 4:
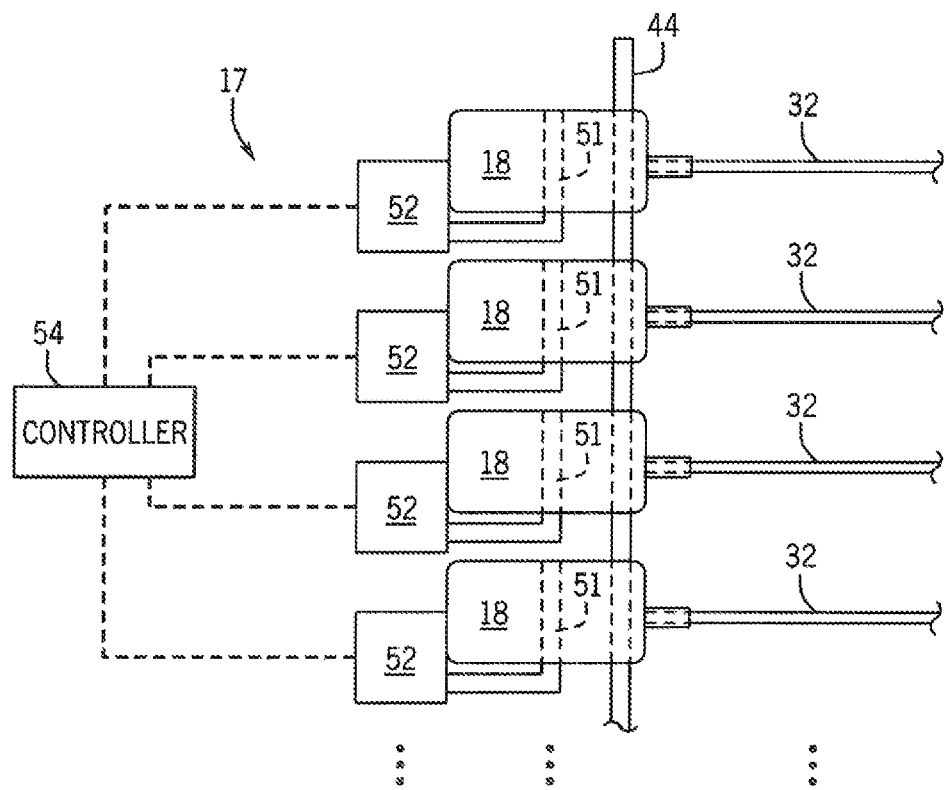
FIG. 4 is a schematic diagram of a fan assembly of the agricultural air cart assembly of the present invention for delivering airflow to dedicated distribution lines.
Figure 5:
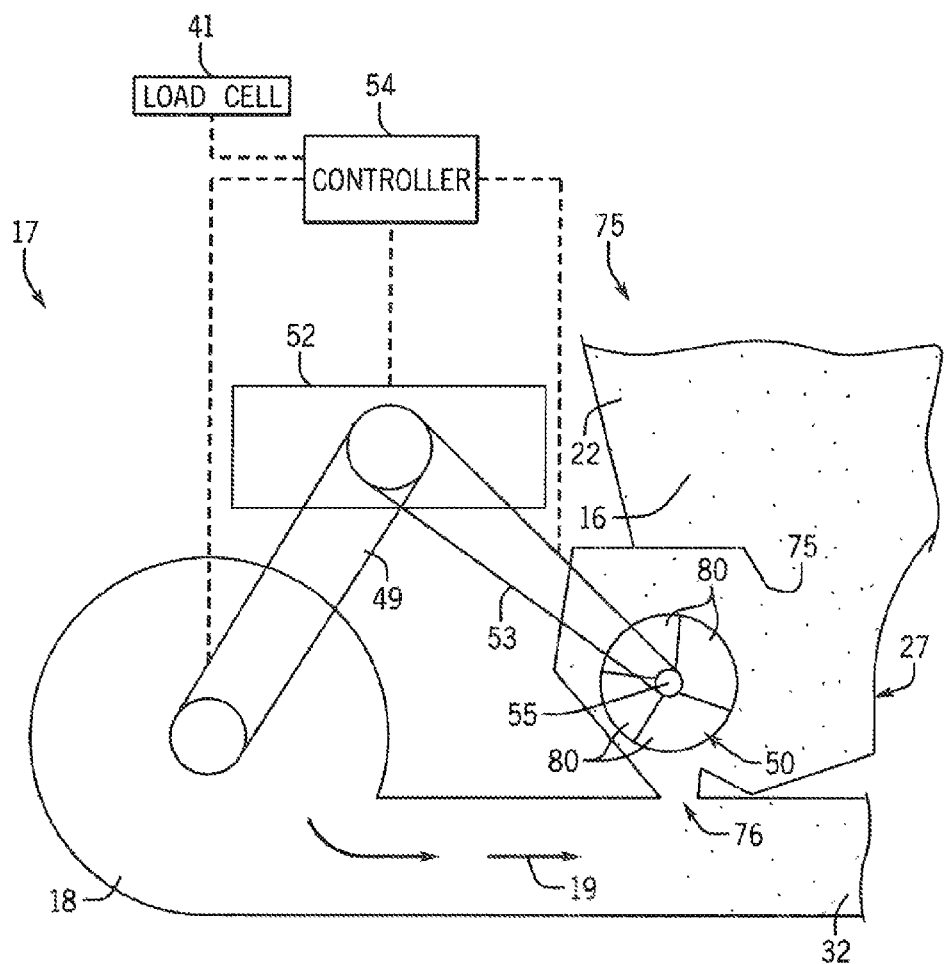
FIG. 5 is a schematic sectional representation of an individual delivery unit of the agricultural air cart assembly of the present invention.

As hereinafter described, a controller 54, FIGS. 3-5, is configured to control distribution of the product 16 from the storage compartments 22 of the air cart 10 to the drill 12. It is contemplated for an operator to enter the configuration of the agricultural air cart assembly 9 into the controller 54 and the desired operating parameters thereof. This configuration may be entered manually, for example, from a pull-down menu presented to the operator. Optionally, the agricultural air cart assembly 9 may include an identifier and the controller 54 may be configured to automatically detect the identifier and determine the agricultural air cart assembly 9 connected to the tractor 8. The controller 54 may include an industrial computer or, e.g., a programmable logic controller (PLC), along with corresponding software and suitable memory for storing such software and hardware, for controlling various components of the agricultural air cart assembly 9, as hereinafter described. A database stored in a memory device may include additional configuration parameters such as the number of storage compartments 22 present on the air cart 10, the number of row units 36 of the drill 12 and the like.

Figure 2:
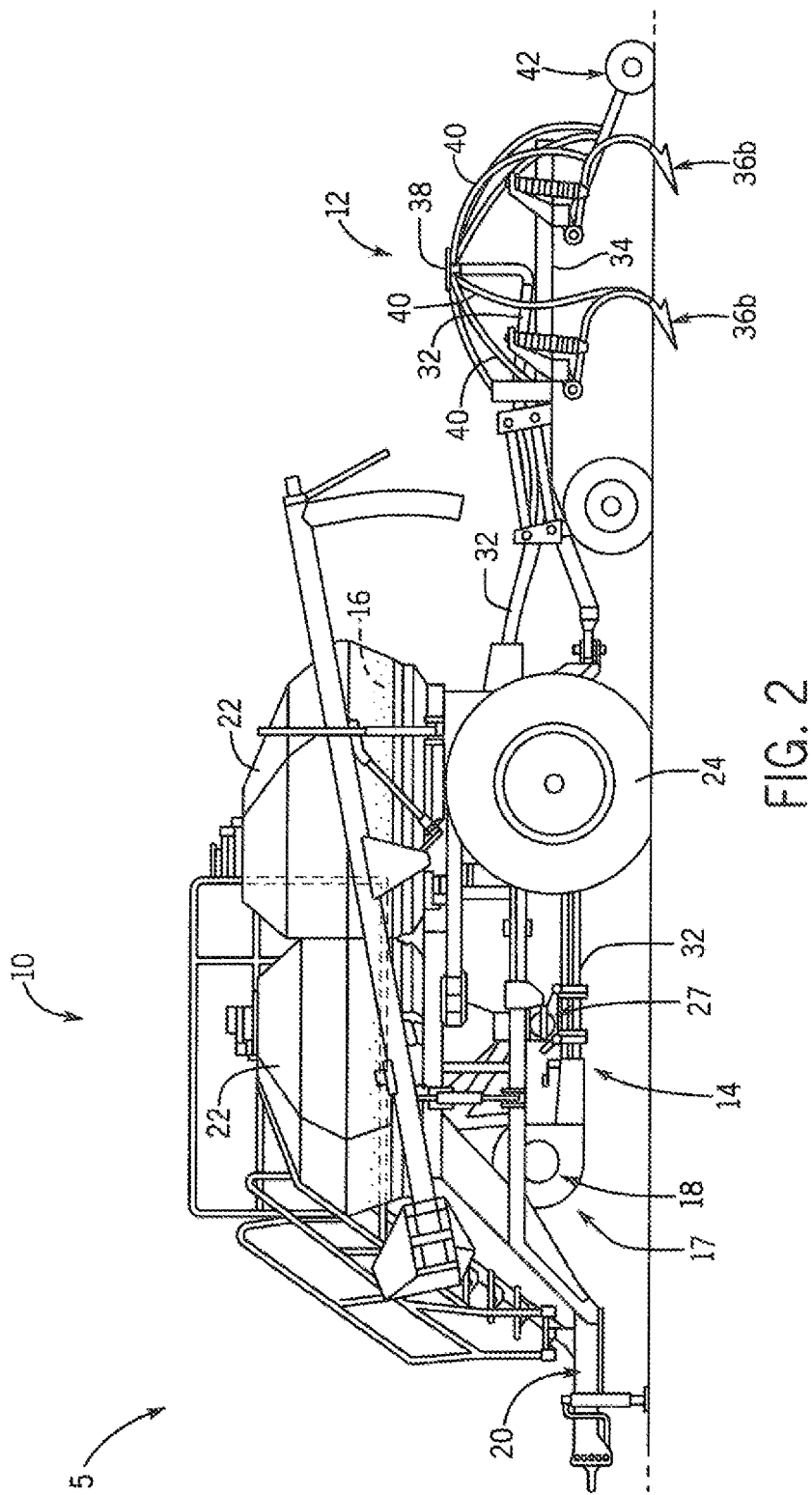
FIG. 2 is a side view of the agricultural air cart assembly of the present invention coupled to the implement of FIG. 1.

Referring to FIGS. 1 and 2, the air cart 10 includes a frame 20 to which storage compartments 22 and wheels 24 are mounted. As hereinafter described, the pneumatic distribution system 14 is configured to supply a controlled volume of product 16 from the storage compartments 22 to corresponding, individual distribution lines 32, at different delivery rates, so that the product 16 can be variably distributed to different portions of the drill 12 and different locations on the agricultural field. More specifically, the pneumatic distribution system 14 of the agricultural air cart assembly 9 includes a plurality of distribution units 17 arranged in a side-by-side relationship along the underside of air cart 10, FIG. 4.

As seen in FIG. 5, each of the distribution units 17 includes a fan 18 for generating an air flow generally designated by the reference numeral 19, directed through a corresponding distribution line 32. The product 16 supplied by the product metering unit 27 to the distribution line 32 becomes entrained in the air flow 19 through the distribution line 32 and carried by the air flow 19 downstream, as hereinafter described. Each of the distribution units 17 also includes a product metering unit 27 having a meter wheel 50 for dispensing the product 16 to the pneumatic distribution system 14 for delivery. The meter wheel 50 of each distribution unit 17 is operatively connected to and driven by a motor 52 via linkage 53 such as a transmission, a drive belt or the like. By way of example, it is contemplated for motor 52 to take the form of a hydraulic motor or an electric motor. It is further contemplated for the linkage 53 to be adjustable such that the rotational speed of the meter wheel 50 may be varied while the motor speed of the motor 52 remains constant. In the depicted embodiment, the motor 52 is shown as also driving the fan 18, as hereinafter described. Alternatively, it can be appreciated that the meter wheel 50 may be directly driven by its own motor, separate from the motor 52 driving the fan 18, without deviating from the scope of the present invention.

The meter wheel 50 of each product metering unit 27 is arranged between the intake 75 and the exit 76 of the product metering unit 27 and may be supported by a rotatable shaft 55 extending concentrically through the meter wheel 50. Each meter wheel 50 has a drum-like configuration and includes multiple compartments 80 circumferentially spaced about the outer periphery thereof. The compartments 80 are sized to convey and control the volume and rate of product 16 transferred from the storage compartment 22, through the exit 76 of product metering unit 27, and into to distribution lines 32, for reasons hereinafter described.

Each motor 52 of the plurality of distribution units 17 and/or the linkage 53 is operatively connected to the controller 54. In order to control the amount of product 16 deposited in a distribution line 32, the controller 54 selectively varies the speed of rotation of the corresponding meter wheel 50. By varying the speed of rotation of the meter wheel 50, the speed of rotation of the compartments 80 may be adjusted to increase or decrease the amount of product supplied to a corresponding distribution line 32. It is noted that the motors 52 and/or the linkage 53 of each of the plurality of distribution units 17 may be individually controlled by controller 54 such that each meter wheel 50 may be operated at different speeds, thereby selectively controlling the amount of the product 16 supplied to each distribution line 32.

Referring to FIGS. 3-5, each of distribution units 17 also includes a fan 18 associated with a corresponding distribution line 32. The fans 18 are supported on air cart 10 by a common support bar 44, FIG. 4. Each fan 18 provides the air flow 19 in distribution lines 32 so as entrain the product 16 supplied by the product metering unit 27 to the distribution line 32, as heretofore described. Each fan 18 includes a drive shaft 51 operatively connect to the motor 52 via linkage 49 such as a transmission, a direct drive mechanism, a drive belt or the like. It is contemplated for the linkage 49 to be adjustable such that the rotational speed of the fan 18 may be varied while the motor speed of the motor 52 remains constant. As described above, in the depicted embodiment, the motor 52 also drives the meter wheels 50 of each distribution unit 17. It can be appreciated that the fans 18 may be directly driven by their own motors, separate from the motors 52 driving the meter wheels 50, without deviating from the scope of the present invention.

Each fan 18, motor 52 and/or linkage 49 of the plurality of distribution units 17 is operatively connected to the controller 54. In order to control the air flow in a distribution line 32, the controller 54 may selectively vary the speed of rotation of each fan 18. By varying the speed of rotation of the fan 18, the volume of the air flowing through a corresponding distribution line 32 may be increased or decreased to an optimal level. It is noted that the rotational speed of the fans 18 of each of the plurality of distribution units 17 may be individually controlled by controller 54 such that each fan 18 may be operated at a different speed, thereby selectively controlling the volume of air flowing through each distribution line 32.

As best seen in FIG. 3, each distribution line 32 is connected to and in communication with a corresponding secondary distribution manifold 38 supported on the frame 34 of the drill 12. It is intended for the product 16 entrained in the air flow 19 in distribution line 32 to be supplied to the secondary distribution manifold 38 under pressure. It is contemplated for each secondary distribution manifold 38 to include a pressure sensor such as a load cell 41 provided therein for measuring the pressure of the air flow 19 received. For reasons hereinafter described. the load cells 41 are operatively connected to controller 54 for providing controller 54 with a signal corresponding to the pressure detected.

Generally, the number of secondary distribution manifolds 38 will match the number of distribution lines 32. However, it is contemplated to interconnect multiple distribution lines 32 into a single secondary distribution manifolds 38 or as hereinafter described, to provide a primary distribution manifold 30 upstream of the secondary distribution manifold to split a distribution line 32 into primary distribution lines 32a, each of which is connected to and in communication with a corresponding secondary distribution manifold 38, FIG. 6.

As is conventional, each secondary distribution manifold 38 has a single opening or input for receiving the product 16 entrained in the air flow 19 in a corresponding distribution line 32 and a plurality of outputs, each of which is in communication with a corresponding secondary distribution line 40. Each secondary distribution manifolds 38 collects the product 16 received at the input thereof and causes the product 16 to be distributed among secondary distribution lines 40. While three secondary distribution lines 40 are depicted in FIG. 3 as emanating from each secondary distribution manifold 38, any number of secondary distribution lines 40 may be used without deviating from the scope of the present invention.

In operation, the product 16 is loaded into the storage compartments 22 of the air cart 10. The tractor 8 tows the agricultural air cart assembly 9 and the drill 12 for pneumatic distribution of the product 16 through the agricultural field. The pneumatic distribution system 14 transfers the product 16 using the distribution units 17 to distribution lines 32. Next, the product flows through the distribution lines 32 to secondary distribution manifolds 38 positioned on the drill 12 wherein the secondary distribution manifolds 38 distributes the product 16 through secondary distribution lines 40 to the row units 36 for distribution into the furrows formed thereby.

It can be appreciated that as the tractor 8 is towed across the agricultural field, the controller 54 actuates the motors 52 of each of the plurality of distribution units 17 at desired speeds in accordance with its operating instructions, as heretofore described. By way of example, the controller 54 may maintain each motor 52 at a desired speed such that each corresponding meter wheel 50 supplies a desired amount of the product 16 to each distribution line 32. Each fan 18 of the plurality of distribution units 17, operatively connected to the motor 52 to which a corresponding meter wheel 50 is operatively connected, provides the air flow 19 in distribution lines 32 so as to entrain the product 16 supplied to the distribution line 32 and carry the product 16 to the secondary distribution manifold 38 under pressure. Each secondary distribution manifolds 38 collects the product 16 received at the input thereof and causes the product 16 to be distributed among secondary distribution lines 40 to corresponding row units 36, wherein the product 16 is deposited in the corresponding furrows cut thereby.

In the event that a meter wheel 50 is driven directly by a corresponding motor 52, it can be appreciated that the increasing or decreasing the rotational speed of the motor 52 will cause the rotational speed of the corresponding meter wheel 50 to increase or decrease. Hence, by increasing or decreasing the rotational speed of a motor 52, the amount of the product 16 supplied to each distribution line 32 may be controlled accordingly. Similarly, if the meter wheels 50 and the fans 18 of the distribution units 17 are connected to distinct motors, the increasing or decreasing the rotational speed of a motor wheel motor will cause the rotational speed of the corresponding meter wheel 50 to increase or decrease, without varying the rotational speed of the fan 18, and hence, the air flow 19 in a corresponding distribution line 32.

Alternatively, the controller 54 may adjust the linkage 53 between motor 52 and meter wheel 50 so as to adjust the rotational speed of the meter wheel 50 without varying the rotational speed of the motor 52. In such manner, if a corresponding fan 18 is operatively connected to the same motor 52 as the meter wheel 50, the rotational speed of such fan 18 may remain constant while the rotational speed of the meter wheel 50 varied by adjustment of the linkage 53.

As previously described, the pressure of the air flows 19 arriving at the inputs of the secondary distribution manifolds 38 is monitored by load cells 41 to insure that the proper volume of air is being delivered thereto. The pressure measurements of the load cells 41 of the secondary distribution manifolds 38 are provided to controller 54 which determines if the air pressures in the secondary distribution manifolds 38 consistent and within acceptable levels. If the air pressures in the secondary distribution manifolds 38 consistent and within acceptable levels, the rotational speeds of the fans 18 are maintained.

If the air pressures in one or more of the secondary distribution manifolds 38 are inconsistent with the other secondary distribution manifolds 38 and/or outside of acceptable levels, the rotational speeds of the fans 18 supplying the air flows to the one or more of the secondary distribution manifolds 38, wherein the air pressures are inconsistent with the air pressures of the other secondary distribution manifolds 38 or outside of acceptable levels, are adjusted to bring the air pressures in those one or more of the secondary distribution manifolds 38 to acceptable levels. In the event that the fans are 18 are driven directly by corresponding motors 52, it can be appreciated that the increasing or decreasing the rotational speed of the motor 52 by the controller 54 will cause the rotational speed of the corresponding fans 18 to increase or decrease, thereby adjusting the air flows in distribution lines 32. Similarly, if the meter wheels 50 and the fans 18 of the distribution units 17 are connected to distinct motors, the increasing or decreasing the rotational speed of a fan motor will cause the rotational speed of the fan 18 connected thereto to increase or decrease, without varying the rotational speed of the meter wheel 50 or the amount of product 16 supplied to a corresponding distribution line 32. Alternatively, in the event that adjustable linkage 49 is used to interconnect the fans 18 to corresponding motors 52, the controller 54 may adjust the linkage 49 between the motors 52 and the one or more desired fans 18 so as to adjust the rotational speed of such fans 18 without varying the rotational speed of the motor 52, thereby adjusting the air flows 19 in distribution lines 32 accordingly.

It is contemplated for controller 54 to monitor the various operating conditions of agricultural air cart assembly 9 to maintain the proper rotational speeds of the fans 18 to achieve a proper air flow rate to the distribution lines 32, and hence, to the secondary distribution manifolds 38. In addition, it is contemplated for controller 54 to provide separate commands to each meter wheel 50 of each distribution unit 17 to determine the proper product distribution rate to the individual distribution lines 32. Accordingly, when using row crop planting techniques such as, e.g., planting point rows, turn rows, headland rows, or end rows, or in other situations which could lead to double planting or other overplanting conditions, the operator or controller 54 can vary the rotational speed of the meter wheel 50, as desired, in the manner heretofore described. As such, the user and/or controller 54 may comprehensively manage the application of the product 16 per distribution unit 17 and manifolds 30, 38 and, thus, on a per-section basis. Further, it is understood that adjusting the speed of fans 18 via controller 54, a user may adjust the product distribution rate on a per-row basis.

The variable control of air flow 19 to the secondary distribution manifolds 38 and of product 16 supplied to each primary distribution line 32 provide a number of advantages. For example, the lengths of the primary distribution lines 32 may be adapted for the distance required to travel on the agricultural apparatus, and do not need to be uniform. In this manner, excess length of distribution lines 32 may be omitted. Another advantage is that a common power source, i.e., motor 52, may be used for both the fan 18 and the meter wheel 50, thus, simplifying the machinery. Another advantage is that it is easy to individually control the amount of air supplied to each distribution line 32 or product delivered to each distribution line 32, thus, adding flexibility to the machine's operation. A still further advantage is that it is possible to disengage the meter wheel 50 to terminate the application of the product 16 on a sectional basis. In addition, by providing a plurality of self-contained distribution units 17 arranged in a side-by-side relationship along the underside of air cart 10, the agricultural air cart assembly 9 is easier to maintain and repair.

Figure 6:
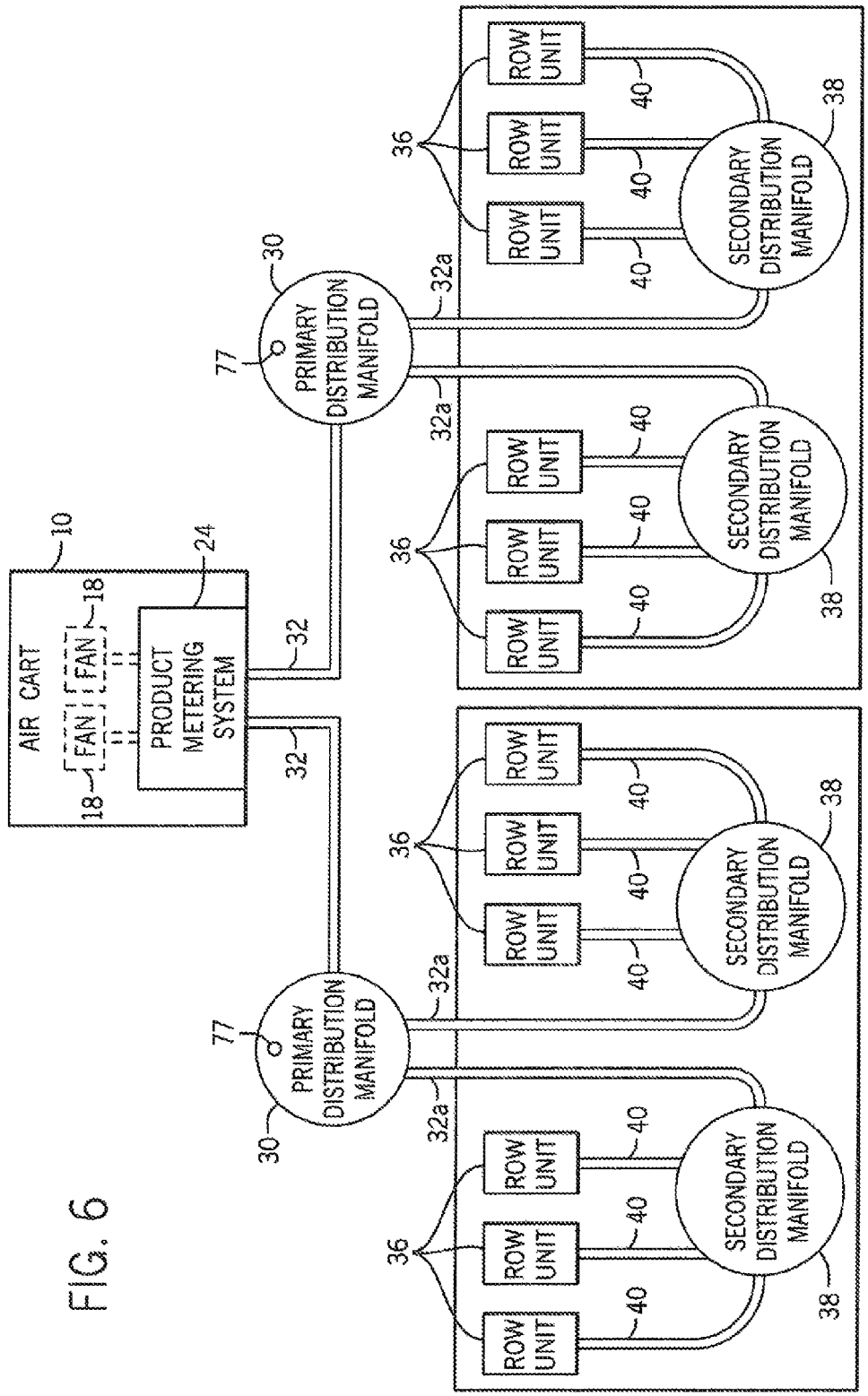
FIG. 6 is a schematic diagram, similar to FIG. 3, showing a variation of the agricultural air cart assembly of the present invention coupled to an implement.

Referring to FIG. 6, it is contemplated to interconnect each distribution line 32 to the input of a primary distribution manifold 30 upstream of the secondary distribution manifolds 38. It is intended for the primary distribution, manifold 30 to receive the product 16 entrained in the air flow 19 in distribution line 32. The primary distribution manifold 30 further includes a plurality of outputs, each of which is in communication with a corresponding secondary distribution manifold 38 via primary distribution lines 32*a*. Each primary distribution manifold 30 collects the product 16 received at the input thereof and causes the product 16 to be distributed along the primary distribution lines 32*a* to the secondary distribution manifolds 38. As heretofore described, each secondary distribution manifolds 38 collects the product 16 received at the input thereof and causes the product 16 to be distributed among secondary distribution lines 40 to corresponding row units 36, wherein the product 16 is deposited in the furrow cut thereby.

It is contemplated for each primary distribution manifold 30 to include a pressure sensor such as a load cell 77 provided therein for measuring the pressure of the air flow 19 received. The load cells 77 are operatively connected to controller 54 such that the pressure measurements of the load cells 77 of the primary distribution manifolds 30 are provided to controller 54 which determines if the air pressures in the primary distribution manifolds 30 consistent and within acceptable levels. If the air pressures in the primary distribution manifolds 30 are consistent and within acceptable levels, the rotational speeds of the fans 18 are maintained. If the an pressures in one or more of the primary distribution manifolds 30 are inconsistent with the other primary distribution manifolds 30 and/or outside of acceptable levels, the rotational speeds of the fans 18 supplying the air flows to the one or more of the primary distribution manifolds 30, wherein the air pressures are inconsistent with the air pressures of the other primary distribution manifolds 30 or outside of acceptable levels, are adjusted to bring the air pressures in those one or more of the primary distribution manifolds 30 to acceptable levels, in the same manner as heretofore described with respect to the secondary distribution manifolds 38. In such manner the user and/or controller 54 may comprehensively manage the application of the product 16, by selected groupings of row units as determined by the primary distribution manifolds 30 connected.

It can be appreciated that each storage compartment 22 of the air cart 10 may contain different products that are transferred separately to a row unit 36 using the pneumatic distribution system 14 as heretofore described. In these so-called "double shot" systems, a first secondary distribution manifolds 38 receives a first product from one of the storage received at the input thereof and causes the first product to be distributed among its secondary distribution lines to corresponding row units 36, wherein the first product is deposited in the furrow cut thereby. A second secondary distribution manifold 38 receives a second product from one of the other storage compartments at the input thereof and causes the second product to be distributed among its secondary distribution lines to same row units 36 which distribute the first product, wherein the second product is also deposited in the furrow cut thereby.

Many changes and modifications could be made to the invention without departing from the spirit thereof. The scope of these changes will become apparent from the appended claims.

I claim:

1. An agricultural air cart assembly for transmitting a controlled volume of product from a storage compartment to a plurality of row units for depositing the product on an agricultural field, comprising:
   a first distribution line for receiving a first supply of the product from the storage compartment therein;
   a second distribution line for receiving a second supply of the product from the storage compartment therein;

a rotatable first fan being operatively connected to the first distribution line and having an adjustable rotational speed, the rotatable first fan being configured such that rotation of the rotatable first fan generates an air flow in the first distribution line which entrains and carries the first supply of the product downstream toward a first row unit; and a rotatable second fan being operatively connected to the second distribution line and having an adjustable rotational speed, the rotatable second fan being configured such that rotation of the rotatable second fan generates an air flow in the second distribution line which entrains and carries the second supply of the product downstream toward a second row unit;

a first meter wheel communicating with the storage compartment and being rotatable about an axis such that rotation of the first meter wheel transfers the first supply of the product from the storage compartment to the first distribution line; and a first motor assembly operatively connected to the rotatable first fan and the first meter wheel.

2. The assembly of claim 1 further comprising a second meter wheel adapted for transferring the second supply of the product from the storage compartment to the second distribution line, the second meter wheel being adjustable to provide a selected rate at which the second supply of product is transferred to the second distribution line.

3. The assembly of claim 1 further comprising:

a controller operable to adjust the rotational speeds of the rotatable first fan and the rotatable second fan;

a first pressure sensor operatively connected to the controller and being positioned to measure a pressure of the air flow in the first distribution line, the first pressure sensor providing a signal representative of the pressure of the air flow in the first distribution line to the controller; and a second pressure sensor operatively connected to the controller and being positioned to measure a pressure of the air flow in the second distribution line, the second pressure sensor providing a signal representative of the pressure of the air flow in the second distribution line to the controller;

wherein the controller adjusts the rotational speed of the rotatable first fan in response to the signal received from the first pressure sensor; and the controller adjusts the rotational speed of the rotatable second fan in response to the signal received from the second pressure sensor.

4. The assembly of claim 1 wherein the rotatable first and second fans are independently driven.

5. The assembly of claim 1 further comprising a controller operatively connected to the first motor assembly, the controller configured to independently adjust at least one of a selected desired rate at which the first supply of product is transferred to the first distribution line and a rotational speed of the rotatable first fan.

6. The assembly of claim 5 wherein the first and second meter wheels are independently driven.

7. An agricultural air cart assembly for transmitting a controlled volume of product from a storage compartment to a plurality of row units for depositing the product on an agricultural field, comprising:

a first distribution line for receiving a first supply of the product from the storage compartment therein;

a second distribution line for receiving a second supply of the product from the storage compartment therein;

a rotatable first fan being operatively connected to the first distribution line and having an adjustable rotational speed, the rotatable first fan being configured such that rotation of the rotatable first fan generates an air flow in the first distribution line which entrains and carries the first supply of the product downstream toward a first row unit;

a rotatable second fan being operatively connected to the second distribution line and having an adjustable rotational speed, the second fan being configured such that rotation of the second fan generates an air flow in the second distribution line which entrains and carries the second supply of the product downstream toward a second row unit; and a first meter wheel adapted for transferring the first supply of the product from the storage compartment to the first distribution line, the first meter wheel being adjustable to provide a selected rate at which the first supply of product is transferred to the first distribution line;

wherein:

the first meter wheel and the rotatable first fan are powered by a first motor;

the first meter wheel is operatively connected to the first motor by adjustable linkage; and adjustment of the linkage varies the rate at which the first supply of product is transferred to the first distribution line.

8. An agricultural air cart assembly for transmitting a controlled volume of product from a storage compartment to a plurality of row units for depositing the product on an agricultural field, comprising:

a first distribution line for receiving a first supply of the product from the storage compartment therein;

a second distribution line for receiving a second supply of the product from the storage compartment therein;

a rotatable first fan being operatively connected to the first distribution line and having an adjustable rotational speed, the rotatable first fan being configured such that rotation of the rotatable first fan generates an air flow in the first distribution line which entrains and carries the first supply of the product downstream toward a first row unit;

a rotatable second fan being operatively connected to the second distribution line and having an adjustable rotational speed, the second fan being configured such that rotation of the second fan generates an air flow in the second distribution line which entrains and carries the second supply of the product downstream toward a second row unit; and a first meter wheel adapted for transferring the first supply of the product from the storage compartment to the first distribution line, the first meter wheel being adjustable to provide a selected rate at which the first supply of product is transferred to the first distribution line;

wherein:

the first meter wheel and the rotatable first fan are powered by a first motor;

the rotatable first fan is operatively connected to the first motor by adjustable linkage; and adjustment of the linkage varies the rotational speed of the rotatable first fan.

* * * * *